United States Patent
Sheetz et al.

(10) Patent No.: US 6,406,588 B1
(45) Date of Patent: Jun. 18, 2002

(54) METHOD OF BONDING A SEAT TRIM COVER TO A FOAM CUSHION UTILIZING A SOLVENT ADHESIVE ACTIVATOR

(75) Inventors: William S. Sheetz, Canton; Jeffrey Frelich, Redford, both of MI (US)

(73) Assignee: Lear Corporation, Southfield, MI (US)

( * ) Notice: Subject to any disclaimer, the term of this patent is extended or adjusted under 35 U.S.C. 154(b) by 1030 days.

(21) Appl. No.: 08/561,570

(22) Filed: Nov. 21, 1995

(51) Int. Cl.[7] .................................................. C09J 5/02
(52) U.S. Cl. ................. 156/309.3; 156/305; 156/306.6; 428/317.1; 428/317.7
(58) Field of Search ............................. 156/309.3, 305, 156/306.6; 428/317.1, 317.7

(56) References Cited

U.S. PATENT DOCUMENTS

| | | | |
|---|---|---|---|
| 4,692,199 A | * | 9/1987 | Kozlowski et al. ......... 264/546 |
| 4,786,351 A | | 11/1988 | Elliott et al. |
| 4,929,304 A | | 5/1990 | Urai et al. |

FOREIGN PATENT DOCUMENTS

| | | | | |
|---|---|---|---|---|
| GB | 817293 | * | 7/1959 | ............... 156/309.3 |

* cited by examiner

Primary Examiner—John J. Gallagher
(74) Attorney, Agent, or Firm—Brooks & Kushman P.C.

(57) ABSTRACT

The method of forming a cushion assembly (10) includes placing a pre-contoured trim layer (16) on a complimentary contoured mold (22), placing an air impervious adhesive film (18) thereover, drawing the trim layer (16) and film (18) against the mold (22), spraying a solvent activator (28) thereover, placing a contoured foam pad (14) over the adhesive film (18) and solvent activator (28), and compressing the foam pad (14) against the trim layer (16) by an upper platen (34) to bond the foam pad (14) and trim layer (16).

12 Claims, 2 Drawing Sheets

METHOD OF BONDING A SEAT TRIM COVER TO A FOAM CUSHION UTILIZING A SOLVENT ADHESIVE ACTIVATOR

TECHNICAL FIELD

The subject invention relates to a method of securing a trim or fabric layer to a cellular foam pad, and more particularly of the type utilized for seating and back cushions in automotive seats.

BACKGROUND OF THE INVENTION

Various techniques have been developed for bonding a trim layer to a foam pad for use in seating, and particularly with automotive seat fabrication. One such type of process is disclosed in U.S. Pat. No. 4,692,199 issued Sep. 8, 1987 in the name of Kozlowski et al, and assigned to the assignee of the subject application. The patent discloses the method of applying a cloth fabric layer to a porous contoured mold, applying an adhesive film layer above the cloth layer, placing a foam pad upon the film, moving an upper platen against the foam pad to compress the foam pad against the adhesive-fabric layer, and applying steam through the porous mold to melt the adhesive and bond the foam and cloth together.

U.S. Pat. No. 4,929,304 issued May 29, 1990 in the name of Urai et al. discloses a method of bonding upholstery to a foam cushion including applying a layer of upholstery to a lower die, spraying a liquid adhesive on the foam cushion, and compressing the foam cushion against the layer of upholstery.

The problem with these prior methods is that, and especially when leather trim is utilized, direct application of heat may damage the leather trim layer. Furthermore, minimizing seat production time is also important in automotive seats.

SUMMARY OF THE INVENTION

The invention is directed toward a method of fabricating a cushion assembly. The method includes the steps of providing a trim layer and a foam pad, placing one of the trim layer or foam pad over a mold surface of a mold, placing an adhesive film over the trim layer or foam pad on the mold surface, applying a solvent activator to one of the trim layer or foam pad or adhesive film, placing the other of the trim layer or foam pad over the adhesive film on the mold, and compressing the adhesive film and solvent activator between the foam pad and trim layer to bond the foam pad and trim layer to one another by the adhesive.

The advantages of the invention include the ability of leather or other heat susceptible trim layers to be utilized in the bonding process. Furthermore, production time is decreased due to application of the solvent.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
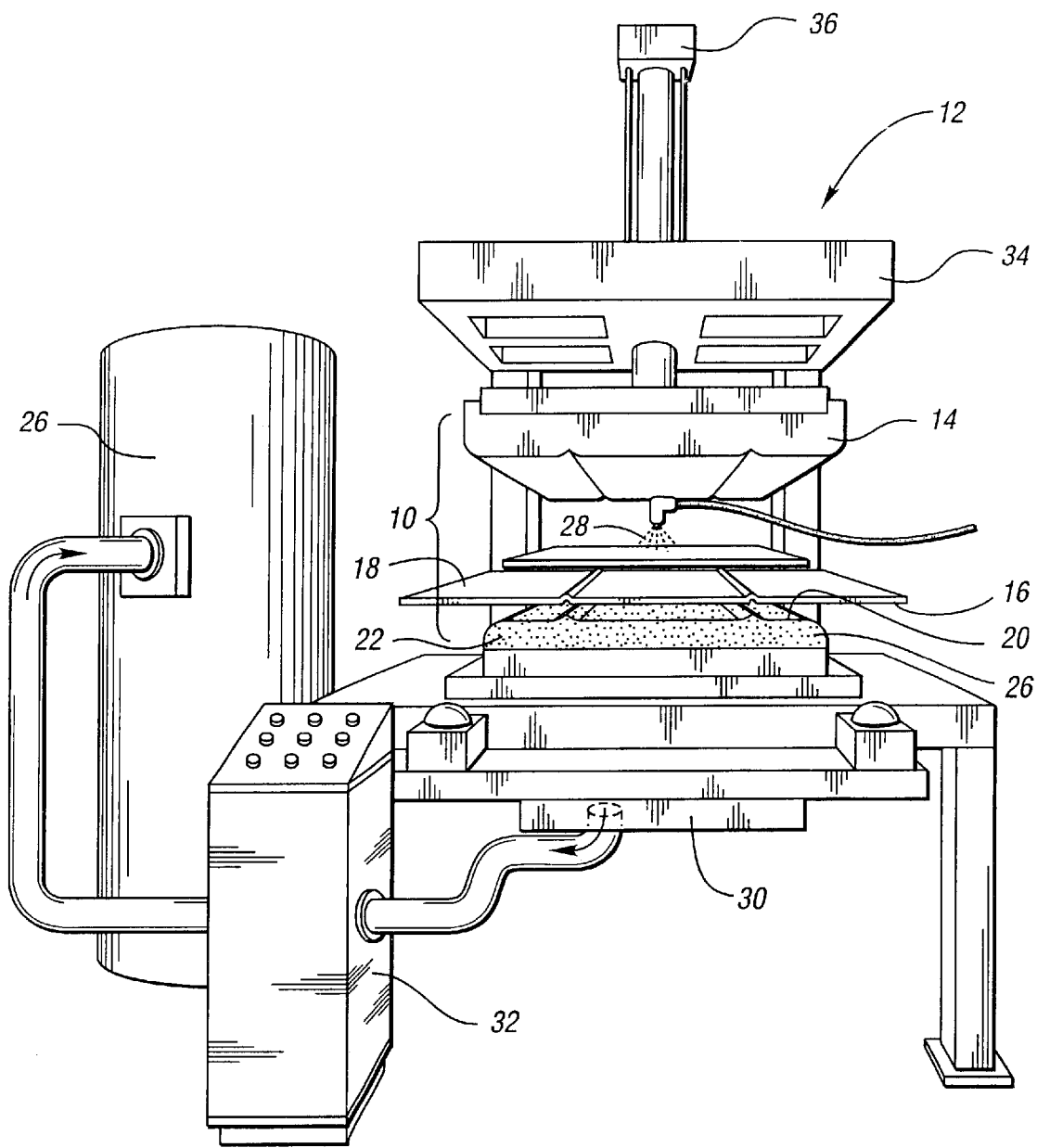
FIG. 1 is a perspective view of the preferred embodiment of an assembly utilized in fabricating the cushion assembly.
Figure 2:
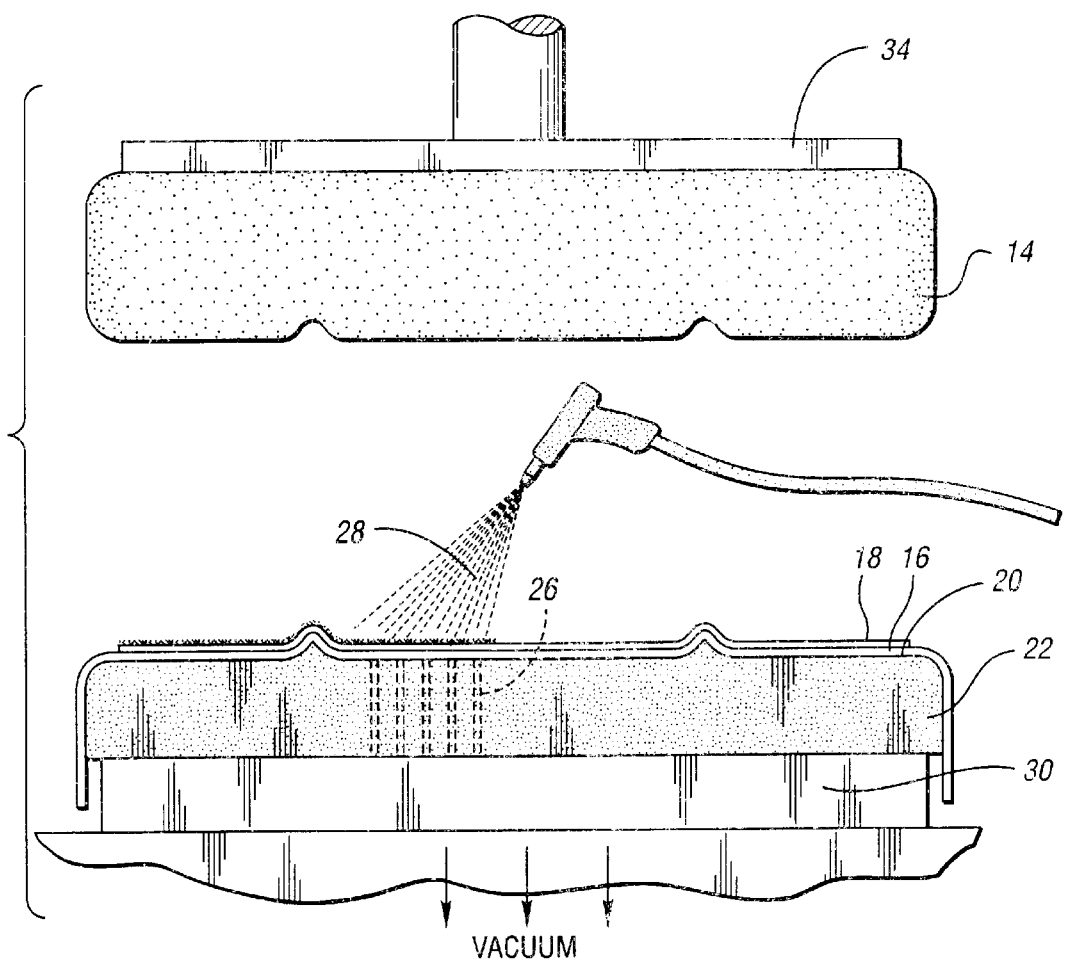
FIG. 2 is a schematic diagram showing the fabric layer and adhesive film disposed over the mold with an application of solvent activator.
Figure 3:
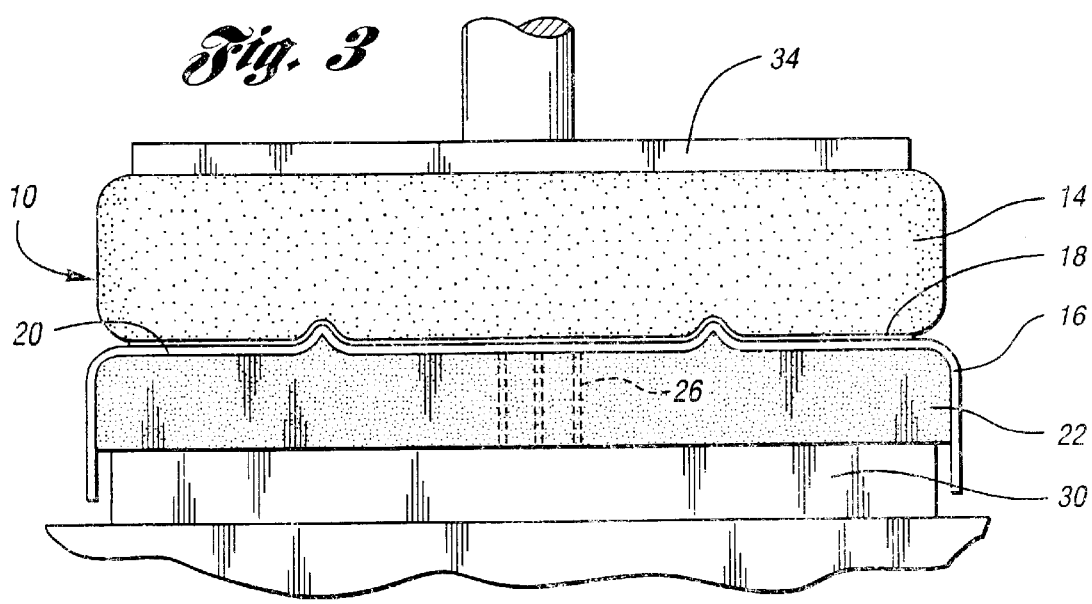
FIG. 3 is a schematic diagram of the foam pad and fabric layer compressed against one another for bonding by the adhesive film.

The method or process of fabricating a cushion assembly 10 generally utilizes the apparatus 12 as illustrated in FIG. 1. The apparatus 12 is utilized to produce the cushion assembly 10 by bonding a cellular foam pad 14 to a trim layer 16 with an air impervious adhesive film 18 therebetween. The cushion assembly 10 is typically utilized as seat and back supports in seat assemblies for automotive vehicles. However, it is to be understood that the cushion assembly 10 may be utilized in other applications of a foam pad and cover material or trim.

The method includes providing the trim layer 16 and foam pad 14. One of the trim layers 16 or foam pad 14 is placed over a mold surface 20 of a mold 22. In the preferred embodiment, the trim layer 16 is placed directly over the mold surface 20. Thereafter, an air impervious adhesive film 18 is placed over the trim layer 16 on the mold surface 20. The mold 22 is preferably porous. A vacuum 24 is applied through apertures 26 in the mold 22. The vacuum 24 draws the trim layer 16 and adhesive film 18 against the mold surface 20 in contour therewith. Wrinkles may be removed by stretching the trim layer 16 and film 18. Thereafter, a solvent activator 28 is applied to either the trim layer 16 the adhesive film 18 or the foam pad 14. Within one minute of applying the solvent activator, the foam pad 14 is placed against the adhesive film 18 and compressed against the mold 22 by an upper platen 34 to compress the foam pad 14 against the trim layer 16 to allow bonding together by the adhesive film 18. One inch of compression is utilized in the preferred embodiment for two minutes. Thereafter, the compression may be removed and the cushion assembly 10 removed from the mold 22.

In the preferred embodiment, the solvent activator 28 is sprayed directly onto the film 18 and is ketone based, such as available from Bostik, Inc. of Massachusetts. The adhesive film 18 is typically a polyamide with phenolic nitrile additive, also available from Bostik, Inc. The adhesive film 18 is thin, and feels like a single layer of trash bag. A preferred material which may be utilized as the adhesive film 18 is clear so the operator can see the fabric or trim layer 16 to remove wrinkles by pulling out the periphery. Once the solvent activator 28 is applied against the film 18, the adhesive film 18 diffuses to bond the trim layer 16 and foam pad 14 and becomes air pervious.

The trim layer 16 may be upholstery, cloth or fabric, typically used to manufacture vehicle seats. Leather or vinyl trim layers are particularly suitable due to the non-application of direct heat. The trim layer 16 is fully sewn and/or contoured to the desired shape of the final seat.

The foam pad 14 may be the cellular type of various different known materials, such as the polyester type or polyurethane type. The foam pad 14 is also formed to the contour of the final cushion assembly 10 and mold 22.

The process is implemented in the apparatus specifically disclosed in U.S. Pat. No. 4,692,199, incorporated by reference herein. As illustrated in FIG. 1, the apparatus 12 includes the mold 22 having a contoured mold surface 20. The contoured mold surface 20 is of a shape complimenting the trim layer 16. Passages or apertures 26 are provided in the mold 22 for establishing fluid communication with the upper mold surface 20. A housing 30 is disposed below the upper mold surface 20 and mold 22 for providing an air tight chamber in communication with the apertures 26 in the mold 22. The mold 22 is preferably made of aluminum. Any other suitable mold materials may be used, such as die cast, ceramic, etc.

The vacuum 24 is connected to the housing 30 to supply a vacuum pressure thereto and through the apertures 26 of the mold 22. The vacuum 24 typically includes a vacuum pump and tank connected by fluid lines to the housing 30, and controlled by a control circuit 32, as described in the referenced patent. The heating which is set forth in the referenced patent is not utilized herein due to use of the solvent activator 28.

Further included is the upper platen 34 which is utilized to compress the foam pad 14 against the trim layer 16 in the mold 22. The upper platen 34 is suspended from a support structure 36 for vertical movement relative to the mold 22 for compressing the foam pad 14 against the molds 22. A pneumatic cylinder moves the upper platen 34 as described in the referenced patent.

The Figures indicate that the adhesive bond is disposed over the entire surface of the foam pad 14 and trim layer 16. However, in accordance with the subject application, the adhesive bond between the foam pad 14 and trim layer 16 may be only a portion of the mating surface, as commonly known in the art.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of fabricating a cushion assembly comprising an outermost trim layer, a foam cushion, and an intermediate adhesive layer which bonds said foam cushion and said trim, said method comprising:

a) providing a contoured mold surface;

b) placing said trim layer over said contoured mold surface;

c) placing an air impervious adhesive film over said trim layer;

d) providing a contoured foam cushion;

e) applying a solvent to at least one of said adhesive film or said foam cushion;

f) placing said foam cushion onto said adhesive film; and g) compressing said foam cushion against said adhesive film to bond said trim to said foam cushion, wherein the bond formed in step g) is formed without direct application of heat.

2. The method of claim 1 wherein said contoured mold surface is provided with passages or apertures communicating with a vacuum source.

3. The method of claim 2 wherein said adhesive film and said trim layer are forced against said contoured mold surface by atmospheric pressure, said vacuum source maintaining the pressure between said adhesive film and said mold surface below atmospheric pressure.

4. The method of claim 1 wherein said solvent is applied only to said adhesive film.

5. The method of claim 1 wherein said solvent is applied only to said foam cushion.

6. The method of claim 1 wherein said solvent is applied both to said foam cushion and to said adhesive film.

7. The process of claim 1 wherein said foam cushion has a contoured surface complementary to the contour of said contoured mold surface.

8. The process of claim 1 wherein said adhesive film comprises a polyamide film.

9. The process of claim 8 wherein said adhesive film comprises a polyamide film also containing a phenolic nitrile additive.

10. The process of claim 1 wherein said solvent comprises a ketone-based solvent.

11. The process of claim 1 wherein said trim layer comprises leather or a heat susceptible trim.

12. The process of claim 1 wherein said trim layer comprises leather trim.

* * * * *